United States Patent
Guerin et al.

(10) Patent No.: US 12,076,795 B2
(45) Date of Patent: Sep. 3, 2024

(54) METHOD FOR PUSHING A TOOL AT THE END OF AN ARTICULATED ARM AGAINST A SURFACE WITHOUT SLIPPING AND DEVICE FOR IMPLEMENTING SAME

(71) Applicant: ADVANCED ELECTRICAL TOOLS, Seclin (FR)

(72) Inventors: Sylvain Guerin, Seclin (FR); Julien Guerin, Gondecourt (FR)

(73) Assignee: ADVANCED ELECTRICAL TOOLS, Seclin (FR)

(*) Notice: Subject to any disclaimer, the term of this patent is extended or adjusted under 35 U.S.C. 154(b) by 664 days.

(21) Appl. No.: 17/286,965

(22) PCT Filed: Oct. 22, 2019

(86) PCT No.: PCT/FR2019/052502
§ 371 (c)(1),
(2) Date: Apr. 20, 2021

(87) PCT Pub. No.: WO2020/084243
PCT Pub. Date: Apr. 30, 2020

(65) Prior Publication Data
US 2021/0387266 A1  Dec. 16, 2021

(30) Foreign Application Priority Data
Oct. 22, 2018 (FR) .................... 18 59732

(51) Int. Cl.
*B23B 35/00* (2006.01)
*B25J 9/16* (2006.01)
*B25J 11/00* (2006.01)

(52) U.S. Cl.
CPC ............. *B23B 35/00* (2013.01); *B25J 9/1633* (2013.01); *B25J 11/0055* (2013.01); *B23B 2270/483* (2013.01)

(58) Field of Classification Search
CPC .... B23Q 15/14; B23Q 15/26; B23B 2270/483
See application file for complete search history.

(56) References Cited

U.S. PATENT DOCUMENTS

2018/0029182 A1* 2/2018 Pereira .................... B23B 39/14

FOREIGN PATENT DOCUMENTS

| WO | 2007/090981 | 8/2007 |
| WO | 2016/174445 | 11/2016 |
| WO | 2017/072466 | 5/2017 |

OTHER PUBLICATIONS

International Search Report for PCT/FR2019/052502, mailed Feb. 11, 2020, 4 pages.
(Continued)

*Primary Examiner* — Alan Snyder
(74) *Attorney, Agent, or Firm* — NIXON & VANDERHYE

(57) ABSTRACT

A method for pushing, with a force a tool at the end of an articulated arm against a surface with a normal, including the steps of: positioning the tool against the surface; applying an increasing force to the tool until reaching a value, corresponding to a fraction of the force, the value of the applied force being monitored; measuring the orientation of the tool with respect to the normal, after having reached the force value; and redirecting the tool so as to recover its initial orientation with respect to the normal. Iteration is carried out to proceed, by repetition of steps to, while progressively increasing the force at each iteration, and until reaching the force value, the increase increment between two successive steps being smaller than a determined value.

19 Claims, 10 Drawing Sheets

(56) References Cited

OTHER PUBLICATIONS

Written Opinion of the ISA for PCT/FR2019/052502, mailed Feb. 11, 2020, 7 pages.

* cited by examiner

METHOD FOR PUSHING A TOOL AT THE END OF AN ARTICULATED ARM AGAINST A SURFACE WITHOUT SLIPPING AND DEVICE FOR IMPLEMENTING SAME

This application is the U.S. national phase of International Application No. PCT/FR2019/052502 filed 22 Oct. 2019, which designated the U.S. and claims priority to FR Patent Application No. 18 59732 filed 22 Oct. 2018, the entire contents of each of which are hereby incorporated by reference.

BACKGROUND OF THE INVENTION

Field of the Invention

The present invention relates to a method for pushing a tool at the end of an articulated arm against a surface as well as a device for the implementation of such a method.

The field of the invention relates to tool positioning, for example a tool used for carrying out drilling, machining, riveting, welding operations, etc., on a surface to be machined, said tool being positioned at the end of an articulated arm, and in particular in the aeronautic industry. Such a tool is intended to be positioned at the end of an articulated arm, which will perform all movements and apply the force necessary for carrying out the desired operations.

Description of the Related Art

Such an articulated arm is well known to a person skilled in the art and is commonly used in the aeronautic industry, in particular because it allows moving easily around an aircraft structure during assembly.

As shown in FIG. 1, such an articulated arm generally includes a pivoting base on which is attached a first segment configured to pivot about a first horizontal axis of rotation, a second segment being articulated about a second horizontal axis of rotation relative to the free end of the first segment. In general, the free end of the second segment comprises an articulation, with one, two or three axes of rotation substantially perpendicular to one another. These different articulations allow displacing the effector in a three-dimensional space and according to three axes of rotation.

In the aeronautic industry, the different parts of the fuselage must undergo different manufacturing operations in order to carry out assembly thereof according to the desired configuration. These operations may consist of drilling, riveting, machining operations, etc., and must be carried out at one or several specific position(s) of said fuselage part. In addition, the tool must also perform a particularly accurate and mastered movement relative to said fuselage part, the requirements in terms of manufacturing quality in the aeronautic industry being particularly high, and the manufacturing tolerances particularly reduced.

In particular, for riveting, or even drilling, operations for example, the tool must be positioned according to a direction substantially coincident with the normal to the surface of said fuselage part. Furthermore, the force applied by the tool on said surface must not cause a slipping of the tool relative to the latter, which would modify the desired position of the tool and therefore would alter the obtained manufacturing quality.

However, applying a force according to a direction substantially normal to the surface will result in deformations of the surface of the fuselage part, in particular by bending. In addition, the reaction force of said surface on the tool will also result in deformations at the articulations of the articulated arm. All these deformations will tend to modify the orientation of the tool with respect to said surface, which will also increase the risks of the tool slipping relative to the latter In order to remedy this slipping, and to ensure that the tool keeps the desired orientation with respect to the surface of the fuselage part to be machined, it is known from document WO 2007/090981 A2 a method for positioning with respect to a surface of an effector including at least one tool intended to perform an assembly step, said effector being attached to the end of an articulated arm prone to apply, via said effector, a force on said surface, said effector including a front wall opposite said surface.

Such a method comprises the steps of:
measuring a relative movement between the front wall and a bearing plate including at least one portion prone to bear, directly or indirectly, against the surface and to be immovable relative to said surface, said bearing plate being linked to the front plate so as to be able to move according to at least one direction parallel to said wall, and controlling said articulated arm so that it performs a movement aiming at compensating for the measured relative movement.

According to an embodiment of this method, the method consists in measuring the pivot angle between a first portion secured to the bearing plate and a second portion prone to be pressed and immovable relative to the surface, the connection between said portions, forming a ball joint, enabling a relative movement according to at least one pivot axis, and in controlling said articulated arm so that it performs a movement aiming at correcting the measured pivot angle.

Thus, in such a device and with such a method, slipping does not occur between said surface and the effector but between the bearing plate and the effector. The means allowing measuring the relative movements between the bearing plate and the effector then allowing compensating for this relative movement thanks to opposing movements of the articulated arm.

In addition, by using said ball joint and the means for measuring the relative pivot angle between the first portion and the second portion of said ball joint, the means for piloting the articulated arm control the articulation(s) of said articulated arm in order to correct said relative pivoting between the two portions of the ball joint so that the tool is disposed according to the normal to the surface.

Nevertheless, such a method and such a device have several drawbacks.

First of all, these are not intended to prevent slipping of the tool on said surface, but to compensate for a possible slipping of the tool on said surface. Yet, the quality of this compensation will necessarily be limited by the errors induced by the measuring means and the means for calculating the compensation to be applied. Therefore, despite the compensation of slipping, the desired position of the tool may be lost throughout the manufacturing operations undergone by said fuselage part.

In addition, the method described in document WO 2007/090981 A2 requiring the combined compensation for the translational movements according to a plane parallel to the surface of the fuselage and for the rotational movements relative to the normal to said surface, this must be implemented by a large number of means, which increases the bulk of the device implementing such a method, as well as the complexity for making it and its cost price.

Finally, the two translational and rotational correction movements cannot be performed at the same time, and must therefore be done consecutively, which increases the completion time of such a method.

SUMMARY OF THE INVENTION

Thus, it is an aim of the present invention to provide a more reliable method for pushing, without slipping, a tool at the end of an articulated arm against a surface enabling the application of a given force by the tool on a surface to be machined without the tool slipping on said surface.

Another aim of the present invention is to provide such a method that is simple and quick to implement, and having a low cost price.

Another aim of the present invention is to provide a device enabling the implementation of such a method that has a simple design and a reduced bulk, as well as a low cost price.

Thus, the invention relates to a method for pushing, with a force F according to an axis A, a tool at the end of an articulated arm against a surface with a normal N, comprising the steps of:
  (a) positioning the tool against said surface, so as to make the axis B of the tool coincide with said axis A of the force F, the axis A being directed according to a pair of angles ($\Theta 0$, $\beta 0$) with respect to the normal N,
  (b) applying an increasing force to the tool until reaching a value Fn, corresponding to a fraction of the force F, the value of the applied force Fn being monitored via means for measuring the reaction force of the surface on the tool,
  (c) measuring the pair of angles ($\eta n$, $\beta n$) of the axis B of the tool with respect to the normal N, after having reached said force value Fn,
  (d) redirecting the tool such that its axis B recovers said orientation according to said pair of angles ($\Theta 0$, $\beta 0$) with respect to the normal N.

According to the invention, process is carried out by iteration, by repetition of steps (b) to (d), while progressively increasing the force Fn at each iteration, and until reaching the force value F, the increase increment $\Delta$Fn between two successive steps Fn corresponding to the difference between the value Fn of one iteration and the value Fn−1 of the previous iteration, said increment $\Delta$Fn being smaller than a determined value, so as to prevent slipping of the tool on the surface throughout the method, from positioning of the tool on the surface during step (a) and until obtaining the desired force F on completion of step (d) of the last iteration of the method.

Thus, at each iteration, a prestress force with a value Fn−1, directed according to the axis A is applied to the tool, which stabilizes the position of the tool against the surface and enables the application of an increase increment $\Delta$Fn with a limited value and until reaching said defined value Fn, such that the resultant reaction force applied by the surface on the tool remains within the friction cone of the tool on the surface, generating no slipping of the tool on the surface.

According to optional features of the method according to the invention, considered separately or in combination:
  the axis A of the push force F corresponds to the normal N to the surface, such that said pair of angles corresponds to ($\Theta 0=0°$, $\beta 0=0°$),
  the increase increment $\Delta$Fn between two successive steps Fn is constant,
  the increase increment $\Delta$Fn between two successive steps Fn is non-constant, increasing,
  the tool is a drilling tool.

The invention also relates to a device comprising a tool with:
  a support body provided with means for measuring a reaction force of a surface on said tool, when the tool bears against said surface,
  means for bearing the tool against said surface, configured so as to achieve bearing the tool on said surface with a variable orientation of the axis B of the tool with respect to the normal N to the surface,
  means for measuring said orientation of the axis B of the tool with respect to the normal N of said surface,
  a tool operative portion, intended to be implemented to perform a manufacturing operation on said surface.

According to the invention, said device also comprises an articulated arm at the end of which said tool is fastened, the articulated arm being configured so as to apply a push force with axis A to the tool, and monitoring means configured for the implementation of the steps of the method for pushing the tool according to any of the embodiments of the method according to the invention.

According to optional features of the device according to the invention, considered separately or in combination:
  the means for bearing the tool against said surface comprise a ball joint comprising a first portion having an end intended to bear against said surface and a second portion rigidly fastened to the support body, the first portion being articulated relative to the second portion according to three degrees of freedom, with a center of rotation,
  said ball joint is configured so that the center of rotation of the ball joint is disposed at the surface when the end of the first portion of the ball joint bears against said surface,
  the two portions of the ball joint are configured so as to constitute a sleeve crossed, at least partially, by the operative portion of the tool,
  the support body has a substantially cylindrical shape.

The invention further relates to a method for pushing, with a force F' according to an axis A', a tool at the end of an articulated arm against a surface with a normal N', wherein the tool is adapted to pivot relative to the surface when positioned against said surface, according to two distinct centers of rotation: a first center of rotation located on said surface and a second center of rotation away from said surface,
  said method comprising the steps of:
  (a') positioning the tool against said surface, so as to make the axis B' of the tool coincide with said axis A' of the force F', the axis A' being directed according to a pair of angles (A0, B0) with respect to the normal N' and the line (O'O18) being directed according to a pair of angles (C0, D0) with respect to the axis B' of the tool 1',
  (b') applying an increasing force to the tool until reaching a value Fn' corresponding to a fraction of the force F', the value of the applied force Fn' being monitored via means for measuring the reaction force of the surface on the tool,
  (c') after having reached said force value Fn':
    measuring the pair of angles (An, Bn) of the inclination of the normal N' of the surface with respect to the axis B' of the tool, and measuring the pair of angles (Cn, Dn) of the inclination of the line (O'O18) with respect to the axis B' of the tool, (d') redirecting the tool with respect to the surface according to two combined rotations about each of the two centers of rotation (O', O18) such that:

the axis B' of the tool recovers said orientation according to said pair of angles (A0, B0) with respect to the normal N' to the surface, the pair of angles (Cn, Dn) is assigned the value (0°, 0°), so as to ensure the alignment of the line (O'O18) with the axis B' of the tool.

According to the invention, process is carried out by iteration, by repetition of steps (b') to (d'), while progressively increasing the force Fn' at each iteration, and until reaching the force value F', the increase increment ΔFn' between two successive steps Fn' corresponding to the difference between the value Fn' of one iteration and the value Fn'−1 of the previous iteration, said increment being smaller than a determined value, so as to prevent slipping of the tool on the surface throughout the method, from positioning of the tool on the surface during step (a') and until obtaining the desired force F' on completion of step (d') of the last iteration of the method.

According to optional features of the method according to the invention, considered separately or in combination:

the axis A' of the push force F' corresponds to the normal N' to the surface, such that said pair of angles (A0, B0) corresponds to the value (0°, 0°); —according to a first alternative, the increase increment ΔFn' is constant, or, according to a second alternative, the increase increment ΔFn' between two successive steps Fn' is non-constant, increasing;

at the end of step (a') and during each of steps (b') to (d'), the second center of rotation is positioned opposite to the tool with respect to the surface.

The invention also relates to a device comprising a tool with:

a support body provided with means for measuring a reaction force R' of a surface on said tool, when the tool bears against said surface, means for bearing the tool against said surface, configured so as to achieve bearing the tool on said surface with a variable orientation of the axis B' of the tool with respect to the surface, according to two distinct centers of rotation: said first center of rotation being located at said surface and said second center of rotation away from said surface, first measuring means configured to measure said orientation of the normal N' of the surface with respect to the axis B' of the tool, and second measuring means configured to measure the orientation of the line (O'O18) with respect to the axis B' of the tool, a tool operative portion, intended to be implemented to perform a manufacturing operation on said surface.

According to the invention, said device also comprises an articulated arm at the end of which said tool is fastened, the articulated arm being configured so as to apply a push force with an axis A' to the tool, and monitoring means configured for the implementation of the steps of the method for pushing the tool according to the invention.

According to optional features of the device according to the invention, considered separately or in combination:

the means for bearing the tool against said surface comprise:

a first ball joint with a center of rotation corresponding to said first center of rotation of the axis B' of the tool with respect to the surface, comprising a first portion having an end intended to bear against said surface and a second portion secured to an intermediate part between said first portion and the support body, the first portion being articulated relative to the second portion according to at least two degrees of freedom, and a second ball joint with a center of rotation corresponding to said second center of rotation of the axis B' of the tool with respect to the surface, comprising a first portion rigidly fastened to said intermediate part and a second portion rigidly fastened to the support body, the first portion being articulated relative to the second portion according to at least two degrees of freedom;

the first portion of the first ball joint comprises a section substantially forming a convex sphere section, and in particular a half-sphere, from which extends, on one side, the end intended to bear against the surface, as well as, on the other side, a first sleeve, configured to internally receive, at least partially, the operative portion of the tool, the first means for measuring the orientation of the normal N' to the surface with respect to the axis B' of the tool being configured so as to measure the displacement of said first sleeve relative to the support body, and said second portion of the first ball joint comprises a section substantially forming a concave sphere section, and in particular a half-sphere, formed on said intermediate part, and configured to cooperate with said section of the first portion of the first ball joint, and the first portion of the second ball joint comprises a section substantially forming a convex sphere section formed on said intermediate part, and in particular a half-sphere from which extends, opposite to the end of the first portion of the first ball joint, a sleeve, internally receiving the first sleeve of the first portion of the first ball joint, the second means for measuring the orientation of the orientation of the line (O'O18) of the tool with respect to the axis B' of the tool being configured so as to measure the displacement of said second sleeve relative to the support body;

said first ball joint is configured so that the first center of rotation of the first ball joint is disposed at the surface when the end of the first portion of the first ball joint bears against said surface, and said second ball joint is configured so that the second center of rotation of the second ball joint is away from the surface and positioned opposite to the tool with respect to the surface, when the end of the first portion of the ball joint bears against said surface.

Finally, the invention relates to a tool intended to be positioned at the end of an articulated arm to be pushed with a force F' according to an axis A' against a surface with a normal N', wherein the tool is adapted to pivot relative to the surface when positioned against said surface, according to two distinct centers of rotation: a first center of rotation located on said surface and a second center of rotation away from said surface, said tool comprising:

a support body provided with means for measuring a reaction force R' of a surface on said tool, when the tool bears against said surface, means for bearing the tool against said surface, configured so as to achieve bearing of tool on said surface with a variable orientation of the axis B' of the tool with respect to the surface, according to two distinct centers of rotation: said first center of rotation located on said surface and said second center of rotation away from said surface, first measuring means configured to measure said orientation of the normal N' of the surface with respect to the axis B' of the tool, and second measuring means configured to measure the orientation of the line (O'O18) with respect to the axis B' of the tool, wherein the means for bearing the tool against said surface comprise:

- a first ball joint with a center of rotation corresponding to said first center of rotation of the axis B' of the tool with respect to the surface, comprising a first portion having an end intended to bear against said surface and a second portion secured to an intermediate part between said first portion and the support body, the first portion being articulated relative to the second portion according to at least two degrees of freedom, and
- a second ball joint with a center of rotation corresponding to said second center of rotation of the axis B' of the tool with respect to the surface, comprising a first portion rigidly fastened to said intermediate part and a second portion rigidly fastened to the support body, the first portion being articulated relative to the second portion according to at least two degrees of freedom.

BRIEF DESCRIPTION OF THE DRAWINGS

The invention will be better understood on reading the following description accompanied with the drawings among which.

DESCRIPTION OF THE PREFERRED EMBODIMENTS

Figure 7:
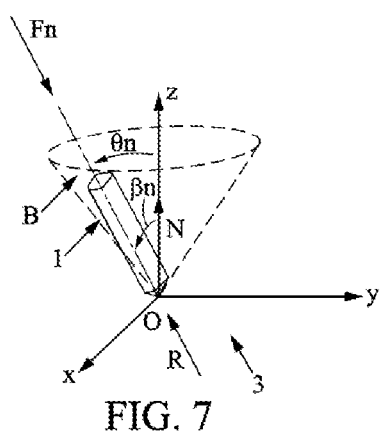

In the present application, a Cartesian reference frame (O, x, y, z) is defined, as represented in FIG. 7, wherein the center O corresponds to the point of contact of the operative portion 17 of the tool 1, hereinafter referred to as the tip O of the tool 1 in contact with the surface 3, the plane (Oxy) corresponds to the plane of the surface 3, and the axis (Oz) corresponds to the normal N to said surface 3, when the latter is at rest, that is to say not subjected to any external load.

The invention relates to a method for pushing, with a force F according to an axis A, a tool 1 at the end of an articulated arm 2 against a surface 3 with a normal N, comprising the steps of:

(a) positioning the tool 1 against said surface, so as to make the axis B of the tool coincide with said axis A of the force F, the axis A being directed according to a pair of angles (Θ0, β0) with respect to the normal N, (b) applying an increasing force to the tool 1 until reaching a value Fn, corresponding to a fraction of the force F, the value of the applied force Fn being monitored via means for measuring the reaction force R of the surface 3 on the tool 1, (c) measuring the pair of angles (Θn, βn) of the axis B of the tool with respect to the normal N, after having reached said force value Fn, (d) redirecting the tool 1 such that its axis B recovers said orientation according to said pair of angles (Θ0, β0) with respect to the normal N.

According to the invention, process is carried out by iteration, by repetition of steps (b) to (d), while progressively increasing the force Fn at each iteration, and until reaching the force value F, the increase increment ΔFn between two successive steps corresponding to the difference between the value Fn of one iteration and the value Fn−1 of the previous iteration, said increment ΔFn being smaller than a determined value, so as to prevent slipping of the tool 1 on the surface 3 throughout the method, from positioning of the tool 1 on the surface 3 during step (a) and until obtaining the desired force F on completion of step (d) of the last iteration of the method.

Figure 8:
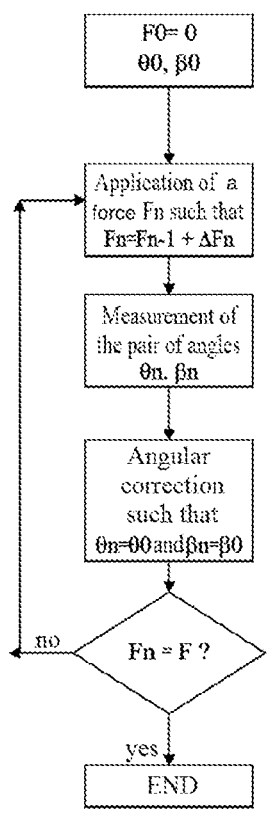

As explained hereinabove, and as schematically represented in FIG. 8, at each iteration, a prestress force with a value Fn−1, directed according to the axis A is applied to the tool 1, which will stabilize the position of the tool 1 against the surface 3 and enable the application of an increase increment ΔFn with a limited value and until reaching said defined value Fn, such that the resultant reaction force R applied by the surface 3 on the tool 1 remains within the friction cone CF of the tool 1 on the surface 3, generating no slipping of the tool 1 on the surface 3.

Thus, thanks to the method according to the invention, slipping of the tool 1, in particular of its tip O, on the surface 3 is prevented. Thus, it is possible to ensure that the tool 1 will keep the desired position on completion of the manufacturing operation carried out by said tool 1, its tip O having not deviated from its initial position once the value F of the push force necessary to said operation is reached.

Advantageously, the value of the force F for pushing the tool 1 against the surface 3 is determined so that it is higher than the value of the force applied by the operative portion 17 of the tool 1 on the surface 3 during said operation, in order to ensure that the tool 1 does not slip on the surface 3 during the implementation of this operation.

Advantageously, slipping is prevented such that it is not necessary to then compensate for it, as described for example in document WO 2007/09081 A2: there is no uncertainty related to the measuring means with regards to the exact value of the slip travel to be compensated to reset the tip O of the tool 1 in the desired position.

In addition, it is also ensured that the push force F is applied according to the desired axis A, the orientation of the axis B of the tool 1 being corrected throughout the method.

Indeed, the push force Fn applied to the tool according to its axis B bears the tool 1 against the surface 3, which therefore exerts a reaction force R on the tool 1, also directed according to the axis B of the tool, with a component according to the normal N to the surface 3 and a component according to a direction orthogonal to said normal N to the surface 3, depending on the friction of the tool 1 on the surface 3. The value of this reaction force R, corresponding to the value of the force Fn, is permanently measured by the means for measuring the reaction force R of the surface 3 on the tool 1.

This force Fn applied on the surface 3 will also cause the local deformation of the surface 3, in particular by bending, which will modify the orientation of the normal N to the surface 3 with respect to the articulated arm, and therefore make the axis B of the tool 1 deviate from the desired direction A set by the movement of the articulated arm 2.

In addition, the reaction force R is transmitted by the tool 1 to the articulated arm 2, and in particular to the articulations of the articulated arm 2, thereby driving them in rotation, and therefore also modifying the orientation of the axis B about the axes (Ox) and (Oy) with respect to the desired direction A.

Thus, each force value Fn, and therefore the increase increment ΔFn, at each iteration, is advantageously set such that the reaction force R is directed such that it lies within the friction cone CF of the tool 1 on the surface 3, as represented in FIG. 7.

For example, each of these values Fn and each of the increase increments ΔFn may be determined experimentally.

An embodiment of the method according to the invention is represented in the form of a flowchart in FIG. 8.

The initial conditions correspond to an orientation (Θ0, β0) of the axis B of the tool 1 with respect to the normal N and to an application of the tip of the tool 1 according to an axis A with a force F0.

For example, the force F0 may be zero, or else, advantageously, slightly above 0, so as to ensure stability of the tip of the tool 1 on the surface 3.

As explained hereinabove, thanks to the method according to the invention, there are only rotational movements to perform in order to compensate for the loss of the position of the axis B of the desired tool, and no translational movement, in particular as described in document WO 2007/09081 A2.

Therefore, the method is quicker to implement.

According to one embodiment, the axis A of the push force F corresponds to the normal N to the surface 3, such that the pair of angles corresponds to (Θ0=0°, β0=0°) during the initial step (a).

Indeed, the method according to the invention finds a particularly advantageous application in the case where the axis A of the push force F corresponds to the normal N to the surface 3.

Nevertheless, the method according to the invention may also be applied in the case where the axis A of the push force F deviates from the normal N to the surface 3, but still in a limited way, in order not to cause slipping of the tool 1 on the surface 3.

In the following description, for more simplicity and therefore for more clarity, the case where the axis A of the push force F corresponds to the normal N to the surface 3 will be described in detail, except where otherwise stated.

According to one embodiment, the increase increment ΔFn between two successive steps Fn is constant.

Thus, the difference between two successive steps Fn is constant, in particular throughout the entire method, which simplifies the implementation thereof.

According to one embodiment, the increase increment ΔFn between two successive steps Fn is non-constant, increasing.

Thus, the more the value of the force Fn approaches the desired value F, the larger the difference will be between two successive steps Fn.

Thanks to this advantageous arrangement of the invention, the implementation time of the method according to the invention, until reaching the value F of the desired push force can be reduced, in particular in comparison with the embodiment in which the difference between two successive steps Fn is constant.

According to the findings of the inventor, this advantageous arrangement of the invention is made possible thanks to the fact that, the higher the prestress force Fn−1 applied to the tool 1 is at each iteration, the more it is possible to apply a large force increase increment ΔFn to the tool 1 before the reaction force R of the surface 3 on the tool 1 gets out of the friction cone CF, and therefore before the tool 1 slips on the surface 3.

For example, this embodiment is schematically represented in FIGS. 5a to 5i, in which four successive steps of an increasing force Fn are applied, such that F1<F2<F3<F4=F, the increase increments of the successive forces ΔFn also increasing.

For clarity, the deformations of the surface 3 are not represented in the different FIGS. 5a to 5i.

Also, for more clarity, the movements of the tool 1 in the plane (Oxz) as defined hereinabove are represented with only the orientation of the axis B of the tool with respect to the normal N to the surface 3 about the axis (Oy), with the angle Θn.

Figure 5A:
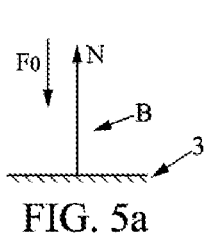

In FIG. 5a, the tool 1 lies in the initial position, corresponding to step (a) of the method, with its axis B aligned with the normal N.

Figure 5B:
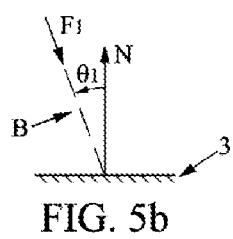
Figure 5C:
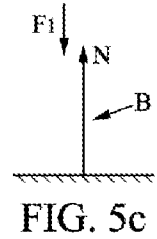

The first iteration of the method with the first sequence of steps (b) to (d) is then represented in FIGS. 5b and 5c, FIG. 5b representing the tool 1 in its position on completion of step (b), its axis B being directed according to the pair of angles (Θn, βn), whereas FIG. 5c represents the tool 1 in its position on completion of step (d).

Figure 5D:
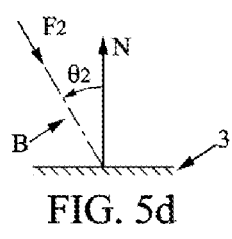
Figure 5E:
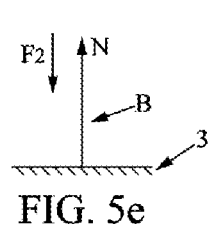
Figure 5F:
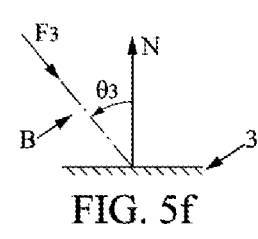
Figure 5G:
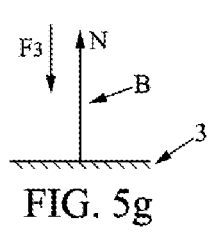
Figure 5H:
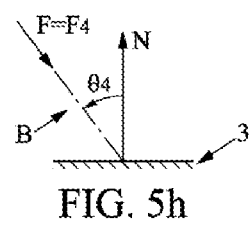
Figure 5I:
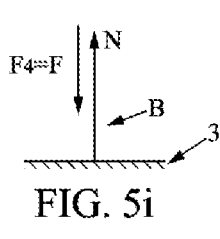

The second iteration of the method with the second sequence of steps (b) to (d) is represented in FIGS. 5d and 5e, the third one in FIGS. 5f and 5g, and the fourth and last one in FIGS. 5h and 5i.

Figure 6:
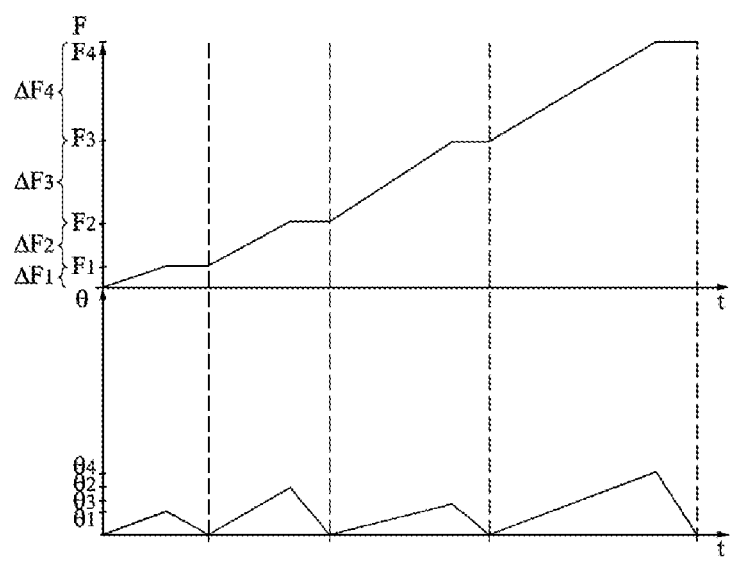
FIG. 6 represents the time charts of the different values assigned to the angle Θn and to the force Fn throughout the method of FIGS. 5a to 5i, FIG. 7 schematically represents the orientation of the axis of the tool of the device of FIG. 2 in a Cartesian reference frame, FIG. 8 schematically represents, in the form of a flowchart, the method according to an embodiment in accordance with the invention.

The time charts represented in FIG. 6 represent the value of the force Fn applied to the tool 1 throughout the above-described four iterations of the method, with the four increasing successive steps F1 to F4, as well as the variation of the value of the angle Θn. For more simplicity, the variation of the value of the angle βn over time is not represented.

As represented in the time chart at the top of FIG. 6, the force Fn may be applied over each of the iterations increasingly until reaching the desired value Fn and then held at this value Fn till the end of step (d), on completion of which the orientation of the axis B of the tool 1 with respect to the normal N to the surface 3 is corrected to recover its initial position.

The variation of the force Fn and of each of the angles Θn and βn over each of said iterations may occur more or less quickly, and in a substantially linear manner, as represented in FIG. 6, or in any other manner, in particular in order to gain more accuracy and/or execution speed.

According to one embodiment, the tool 1 is a drilling tool.

Alternatively, the tool 1 may be of any other type of tools used in the context of aircrafts manufacturing, such as for example a riveting, welding, boring tool, etc.

The invention also relates to a device 10 comprising a tool 1 with:
- a support body 11 provided with means for measuring a reaction force R of a surface 3 on said tool 1, when the tool 1 bears against said surface,
- means for bearing 12 the tool 1 against said surface 3, configured so as to achieve bearing of the tool 1 on said surface 3 with a variable orientation of the axis B of the tool 1 with respect to the normal N to the surface 3,
- means for measuring said orientation of the axis B of the tool 1 with respect to the normal N to said surface 3,
- a tool operative portion 17, intended to be implemented to perform a manufacturing operation on said surface 3.

According to the invention, said device 10 also comprises an articulated arm 2 at the end of which the tool 1 is fastened, the articulated arm 2 being configured so as to apply a push force with an axis A to the tool 1, and monitoring means configured for the implementation of the steps of the method for pushing the tool 1 according to any of the previously described embodiments.

For example, the articulated arm 2 may be a six-axis robotic arm.

All of the arrangements relating to the previously described method apply to the device 10 according to the invention.

Figure 1:
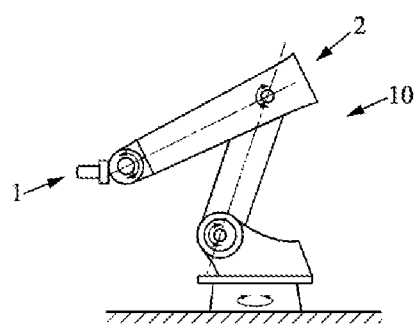
FIG. 1 is a schematic view of the device according to an embodiment in accordance with the invention.

As shown in the embodiment of FIG. 1, the articulated arm 2 of the device 10 is a robotic articulated arm commonly used in the aeronautic industry to carry out, in an automated way, different operations for manufacturing an aircraft, as previously described.

The orientation and the positioning of the tool 1, and therefore of the axis B of the tool 1, in the space (Oxyz) are achieved thanks to the different articulations of the articulated arm 2, fastening means being provided between said tool 1 and the end of the articulated arm 2 receiving the latter, configured so as to ensure immobilization of the tool 1 relative to the articulated arm 2.

The tool operative portion 17 is the element that will carry out, as such, the desired manufacturing operation on said surface 3 of the part. For example, the tool operative portion 17 may be a drill bit in the case of a drilling operation, a mill cutter in the case of a milling operation, etc.

Thus, the operative portion of the tool 17 may be adapted to be displaced relative to the support body 11 of the tool 1, for example by being rotated about the axis B of the tool 1 and/or by translating along said axis B, in the case of a drilling tool. Additional drive means (not represented) may be provided to this end.

Similarly, pushing the tool 1 with the force Fn against the surface 3 may be carried out via the articulated arm 2 which urges the tool 1 against the surface 3.

In particular, throughout the course of the method according to the invention, the positioning of the tool 1 during step (a), the application of a force Fn to the tool 1 during step (b) and the redirection of the tool during step (d) can be performed thanks to the movements of the articulated arm 2, piloted via the monitoring means.

For example, the non-represented monitoring means may comprise one or several electronic circuit(s), configured so as to receive the information measured by the means for measuring a reaction force R of the surface 3 on the tool 1 and by the means for measuring the orientation of the axis B of the tool 1 with respect to the normal N to said surface 3, and to transmit control signals to the articulated arm 2 so as to execute said method.

For example, the monitoring means may comprise computer means.

Figure 2:
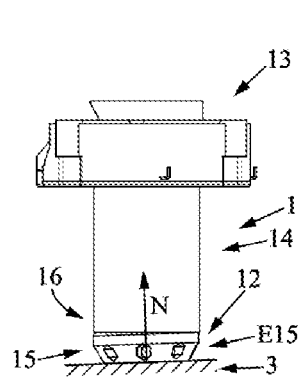
FIG. 2 is a front view of the tool of the device of FIG. 1.
Figure 3:
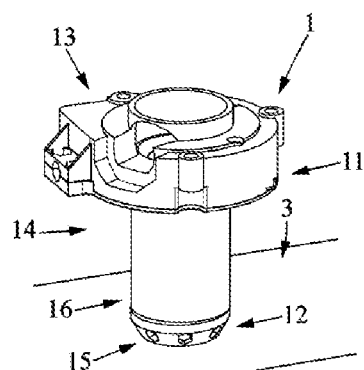
FIG. 3 is a perspective view of the tool of FIG. 2.
Figure 4:
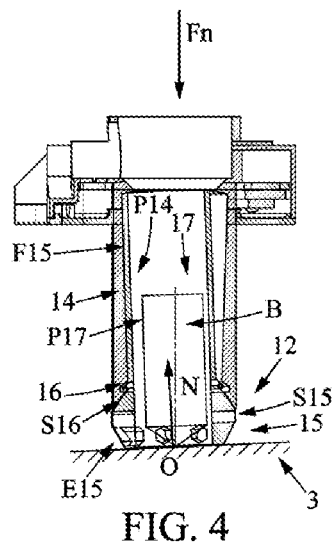
FIG. 4 is a sectional view according to the line 4-4 of FIG. 2, FIGS. 5a to 5i schematically represent different successive steps of the method according to an embodiment in accordance with the invention, with several iterations of steps (b) to (d)

As shown in the embodiments of FIGS. 2 to 4, the support body 11 of the tool 1 may comprise a fastening portion 13, configured so as to ensure the rigid fastening of the tool 1 at the end of the articulated arm 2, for example via fastening screws.

The support body 11 may also comprise a section 14 for receiving the operative portion of the tool 17, including for example an internal wall P14, configured to enable the passage of the operative portion of the tool 17 relative to the support body 11.

Advantageously, said internal wall P14 has a shape matching with that of the tool operative portion 17, for example cylindrical in the case of a cylindrical-shaped tool operative portion 17.

The fastening portion 13 may be disposed above the receiving section 14 of the support body 11 when the tool 1 bears on the surface 3, in its operating position for the implementation of the method according to the invention, as shown in the embodiments of FIGS. 2 to 4.

For example, the means for measuring a reaction force R of the surface 3 on the tool 1 may comprise one or several force sensor(s) (for example strain gauges) disposed on the support body 11, and in particular on the section 14 for receiving the operative portion of the tool 17.

Alternatively or complementarily, said means for measuring a reaction force R of the surface 3 on the tool 1 may be disposed on the articulated arm 2.

For example, the means for measuring the orientation of the axis B of the tool 1 with respect to the surface 3 may comprise one or several angular sensor(s) disposed on the tool 1.

Advantageously, said means for measuring the orientation of the axis B of the tool 1 with respect to the surface 3 may be configured to measure the modification of the orientation of the bearing means 12 of the tool 1 with respect to the normal N to the surface 3, which corresponds to the orientation of the axis B of the tool 1 with respect to the surface 3.

According to one embodiment, the means for bearing 12 the tool 1 against said surface 3 comprise a ball joint 12 comprising a first portion 15 having an end E15 intended to bear against said surface 3 and a second portion 16 rigidly fastened to the support body 11, the first portion 15 being articulated relative to the second portion 16 according to three degrees of freedom, with a center of rotation O.

The end E15 serving for bearing may be configured so as to obtain a continuous or discontinuous circular bearing. For example, the circular bearing may have a diameter smaller than 5 cm, preferably smaller than 3 cm, and even more preferably smaller than 2 cm.

According to one embodiment, the first portion 15 of the ball joint 12 may comprise a section S15 substantially forming a convex sphere section, and in particular a half-sphere, from which extends, on one side, the end E15 intended to bear against the surface 3, as well as, on the other side, a sleeve F15, configured to internally receive, at least partially, the operative portion of the tool 17, the means for measuring the orientation of the axis B of the tool 1 with respect to the surface 3 being configured so as to measure the displacement of said sleeve F15 relative to the support body 11.

Indeed, the angular variation of the angles Θn and βn of the axis B of the tool 1 with respect to the normal N to the surface 3 being small throughout the implementation of the method according to the invention, for example in the range of a few minutes of arc, it may turn out to be complicated to determine this angular variation at said section S15 of the first portion 15 of the ball joint 12.

Yet, the modification of the orientation of the axis B of the tool 1 with respect to the normal N to the surface 3 will generate a considerable displacement at the upper end of the sleeve F15, that is to say the end located opposite to the end E15 of the first portion 15 of the ball joint 12, by a lever arm effect, which is easier to measure to determine the orientation of the first portion 15 with respect to the second portion 16 of the ball joint 12.

As shown in the embodiment of FIG. 4, in order to facilitate this measurement, it may be advantageous to maximize this displacement using a sleeve F15 with a large length, for example such that its upper end lies proximate to the fastening portion 13 of the support body 11.

Thus, the means for measuring the orientation of the axis B of the tool 1 with respect to the surface 3 may advantageously be positioned on the support body 11, on the section for receiving 14 the operative portion of the tool 17, and in particular proximate to the fastening portion 13 of the support body 11, which allows avoiding encumbering the area proximate to the end E15 of the first portion 15 of the ball joint 12.

In such an embodiment, the internal wall P14, enabling the passage, may correspond, at least partially, to the internal wall of the sleeve F15.

As shown in the embodiments of FIGS. 2 to 4, the second portion 16 of the ball joint 12 may comprise a section S16 substantially forming a concave sphere section, and in particular a half-sphere, with dimensions corresponding to the section S15 of the first portion 15 of the ball joint 12, in order to constitute a seat for said section S15 of the first portion 15 of the ball joint 12, in order to enable the rotation of the first portion 15 relative to the second portion 16 about the previously-defined three axes (Ox), (Oy) and (Oz).

Friction reduction means, such as for example balls, may be provided in order to facilitate the rotation of the first portion 15 relative to the second portion 16. Also, fastening means may be provided in order to ensure the translational immobilization, and in particular according to the axis (Oz) of the first portion 15 relative to the second portion 16.

According to one embodiment, said ball joint 12 is configured so that the center of rotation O of the ball joint 12 is disposed at the surface 3, when the end E15 of the first portion of the ball joint 15 bears against said surface 3.

This arrangement is particularly advantageous because the force exerted by the tool 1 is applied at the center of rotation O of the ball joint 12.

Thus, the modification of the orientation of the axis B of the tool 1 with respect to the normal N to the surface 3 will correspond to the modification of the orientation of the first portion 15 with respect to the second portion 16 of the ball joint 12, and in particular in the case where it is the latter which is measured, which simplifies the calculation of the orientation of the axis B of the tool 1 with respect to the normal N to the surface 3.

According to one embodiment, the support body 11 has a substantially cylindrical shape.

This advantageous arrangement of the invention allows reducing the bulk of the tool 1, and in particular in the case where the tool operative portion 17 has a cylindrical shape, such as for example a drilling tool.

Figure 14:
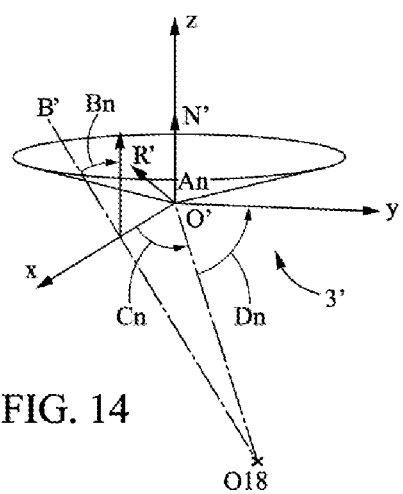

In the present application, there is also defined a Cartesian reference frame (O', x, y, z), as represented in FIG. 14, wherein the center O' corresponds to a first center of rotation of the axis B' of the tool 1' in contact with the surface 3', relative to the normal N' to the surface 3'. Also, the plane (O'xy) corresponds to the plane of the surface 3', and the axis (O'z) corresponds to the normal N' to said surface 3', when the latter is at rest, that is to say not subjected to any external load.

The invention further relates to a method for pushing with a force F' according to an axis A' a tool 1' at the end of an articulated arm 2' against a surface 3' with a normal N', wherein the tool 1' is adapted to pivot relative to the surface 3' when positioned against said surface 3', according to two distinct centers of rotation: a first center of rotation O' located on said surface 3 and a second center of rotation O18 away from said surface 3'.

According to the invention, said method comprises the steps of:
(a') positioning the tool 1' against said surface 3', so as to make the axis B' of the tool coincide with said axis A' of the force F', the axis A' being directed according to a pair of angles A0, B0 with respect to the normal N' and the line (O'O18) being directed according to a pair of angles C0, D0 with respect to the axis B' of the tool 1',
(b') applying an increasing force to the tool 1 until reaching a value Fn', corresponding to a fraction of the force F', the value of the applied force Fn' being monitored via means for measuring the reaction force R' of the surface 3' on the tool 1',
(c') after having reached said force value Fn':
measuring the pair of angles (An, Bn) of the inclination of the normal N' of the surface 3' with respect to the axis B' of the tool 1', and
measuring the pair of angles (Cn, Dn) of the inclination of the line (O'O18) with respect to the axis B' of the tool 1,
(d') redirecting the tool 1' with respect to the surface 3' according to two combined rotations about each of the two centers of rotation (O', O18) such that:
the axis B' of the tool 1' recovers said orientation according to said pair of angles (A0, B0) with respect to the normal N' to the surface 3',
the pair of angles (Cn, Dn) is assigned the value (0°, 0°), so as to ensure the alignment of the line (O'O18) with the axis B' of the tool 1'.

According to the invention, process is carried out by iteration, by repetition of steps (b') to (d'), while progressively increasing the force Fn' at each iteration, and until reaching the force value F', the increase increment ΔFn' between two successive steps Fn' corresponding to the difference between the value Fn' of one iteration and the value Fn'-1 of the previous iteration, said increment being smaller than a determined value, so as to prevent slipping of the tool 1' on the surface 3' throughout the method, from positioning of the tool 1' on the surface 3' during step (a') and until obtaining the desired force F' on completion of step (d') of the last iteration of the method.

Thus, with the method according to the invention, at each iteration, a prestress force with a value Fn'−1, directed according to the axis A' is applied to the tool 1', which will stabilize the position of the tool 1' against the surface 3' and enable the application of an increase increment ΔFn' with a limited value and until reaching said defined value Fn', such that the resultant reaction force R' applied by the surface 3' on the tool 1' remains within the friction cone CF' of the tool F' on the surface 3', generating no slipping of the tool 1' on the surface 3'.

Thus, thanks to the method according to the invention, slipping of the tool 1', on the surface 3', and in particular of the tool operative portion 17' during its implementation to perform a manufacturing operation on the surface 3', is prevented. Thus, it is possible to ensure that the tool 1' will keep the desired position on completion of the manufacturing operation carried out by said tool F', the latter, and in particular the tip of the tool operative portion 17', having not deviated from its initial position once the value F' of the push force necessary to said operation is reached.

Advantageously, the value of the force F' for pushing the tool 1' against the surface 3', is determined so that the latter is higher than the value of the force applied by the operative portion 17' of the tool 1' on the surface 3' during said operation, in order to ensure that the tool 1' does not slip on the surface 3' during the implementation of this operation.

With the method according to the invention, it is ensured that the push force F' is applied according to the desired axis A', the orientation of the axis B' of the tool 1' being continuously corrected, throughout the method.

Indeed, the push force Fn', applied to the tool 1' according to its axis B', bears the tool 1' against the surface 3', which thus exerts a reaction force R' on the tool 1', also directed according to the axis B' of the tool, with a component according to the normal N' to the surface 3' and a component according to a direction orthogonal to said normal N' to the surface 3', depending on the friction coefficient between the tool 1' and the surface 3. The value of this reaction force R', corresponding to the value of the force Fn', is permanently measured by the means for measuring the reaction force R' of the surface 3' on the tool 1'.

This force Fn' applied on the surface 3' will also cause the local deformation of the surface 3', in particular by bending, which will modify the orientation of the normal N' to the surface 3' with respect to the articulated arm 2' receiving said tool F', and therefore make the axis B' of the tool 1' deviate from the desired direction A' set by the movement of the articulated arm 2'.

In addition, the reaction force R' is transmitted by the tool 1' to the articulated arm 2', and in particular to the articulations of the articulated arm 2', thereby driving them in rotation, and therefore also modifying the orientation of the axis B' with respect to the desired direction A', and about different centers of rotation.

According to the findings of the inventor, by enabling the axis B' of the tool 1' to pivot relative to the normal N' to the surface 3' according to a combined rotation about two distinct centers of rotation O' and O18, and by then canceling this pivoting of the axis B' of the tool 1' relative to the normal N' to the surface 3', it is possible to compensate for all undesired displacements of the articulated arm 2' about all of its articulations, so as to make the axis B' of the tool 1' coincide with the axis A' of the desired force F' at the end of each iteration.

Also, each force value Fn', and therefore the increase increment ΔFn', at each iteration, is advantageously set such that the reaction force R' is directed such that it lies within the friction cone CF' of the tool 1' on the surface 3, as represented in FIG. 14.

For example, each of these values Fn' and each of the increase increments ΔFn' may be determined experimentally.

Figure 15:
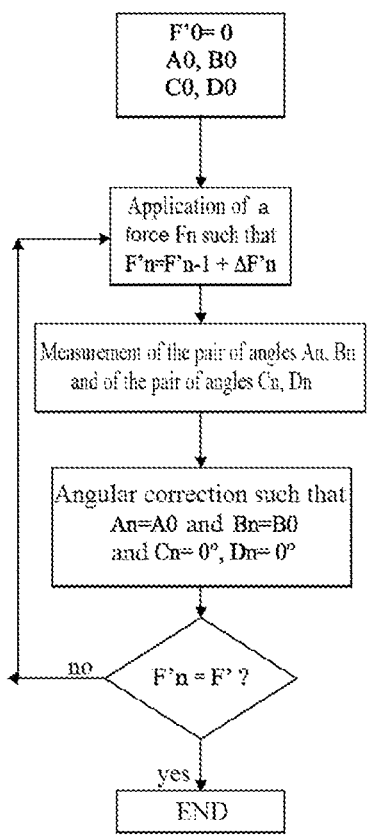

An embodiment of the method according to the invention is represented in the form of a flowchart in FIG. 15.

The initial conditions correspond to an orientation (A0, B0) of the normal N' to the surface 3' with respect to the axis B' of the tool 1', to an orientation (C0, D0) of the line (O'O18) with respect to the axis B' of the tool 1', and to an application of the tool 1' against the surface 3' with its axis B' according to an axis A', and with a force F0'.

Advantageously, the orientation (C0, D0) of the line (0'O18) with respect to the axis B' of the tool 1' may substantially amount to (0°, 0°), the line (O'O18) being aligned with the axis B' of the tool 1'.

For example, the force F0' may be zero, or else, advantageously, slightly higher than 0 N, so as to ensure stability of the tool 1' on the surface 3'.

As explained hereinabove, thanks to the method according to the invention, there are only rotational movements to perform about each of the first O' and second O18 centers of rotation to compensate for the loss of the position of the axis B' of the desired tool, and no translational movement, which facilitates and simplifies the implementation of the method according to the invention.

Therefore, the method is also quicker to implement.

According to one embodiment, the axis A' of the push force F' corresponds to the normal N' to the surface 3', such that said pair of angles (A0, B0) corresponds to the value (0°, 0°).

Indeed, the method according to the invention finds a particularly advantageous application in the case where the axis A' of the push force F' corresponds to the normal N' to the surface 3'.

Nevertheless, the method according to the invention may also be applied in the case where the axis A' of the push force F' deviates from the normal N' to the surface 3', but still in a limited way, in order not to cause slipping of the tool 1' on the surface 3'.

In the following description, for more simplicity and therefore for more clarity, the case where the axis A' of the push force F' corresponds to the normal N' to the surface 3' will be described in detail, except where otherwise stated.

According to one embodiment, the increase increment ΔFn' between two successive steps Fn is constant.

Thus, the difference between two successive steps Fn' is constant, in particular throughout the entire method, which simplifies implementation thereof.

According to one embodiment, the increase increment ΔFn' between two successive steps Fn is non-constant, increasing.

Thus, the more the value of the force Fn' approaches the desired value F', the larger will be the difference between two successive steps Fn'.

Thanks to this advantageous arrangement of the invention, the implementation time of the method according to the invention, until reaching the value F' of the desired push force can be reduced, in particular in comparison with the embodiment in which the difference between two successive steps Fn' is constant.

According to the findings of the inventor, this advantageous arrangement of the invention is made possible thanks to the fact that, the higher is the prestress force Fn−1' applied to the tool F' at each iteration, the more it is possible to apply a large force increase increment ΔFn' to the tool 1' before the reaction force R' of the surface 3' on the tool 1' gets out of the friction cone CF', and therefore before the tool 1' slips on the surface 3'.

For example, this embodiment is schematically represented in FIGS. 12a to 12i, in which four successive steps of an increasing force Fn' are applied, such that F1'<F2'<F3'<F4'=F', the increase increments of the successive forces ΔFn' also increasing.

For clarity, the deformations of the surface 3' are not represented in the different FIGS. 12a to 12i.

Also, for more clarity, there are represented the movements of the axis B' of the tool 1' in the plane (Oxz) as defined hereinabove with only the orientation of the normal N' to the surface 3' with respect to the axis B' of the tool 1' about the axis (O'y) according to the center of rotation O', with the angle An, and the orientation of the line (O'O18) with respect to the axis B' of the tool 1' about the axis (O'y) according to the center of rotation O18, with the angle Cn.

Figure 12A:
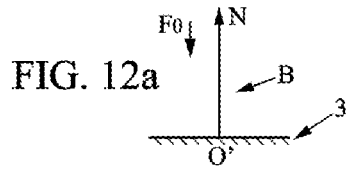

In FIG. 12a, the tool 1' lies in the initial position, corresponding to step (a') of the method, with its axis B' aligned with the normal N' to the surface 3'.

Figure 12B:
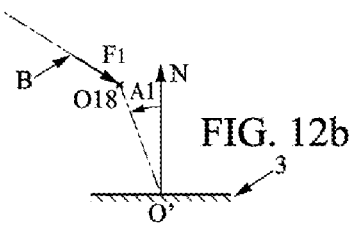
Figure 12C:
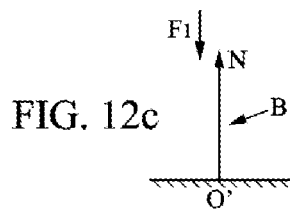

The first iteration of the method with the first sequence of steps (b') to (d') is then represented in FIGS. 12b and 12c, FIG. 12b representing the tool 1 in its position on completion of step (b'), its axis B' being directed according to the pair of angles (An, Bn) about the first center of rotation O' and according to the pair of angles (Cn, Dn) about the second center of rotation O18, whereas FIG. 12c represents the tool 1' in its position on completion of step (d').

Figure 12D:
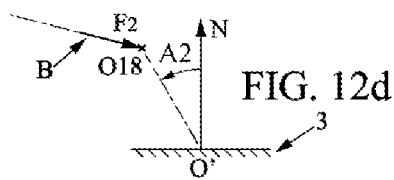
Figure 12E:
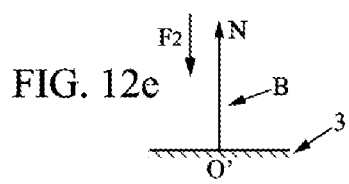
Figure 12F:
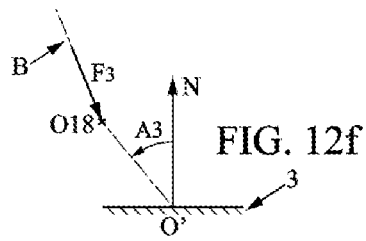
Figure 12G:
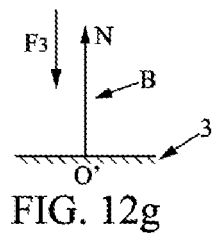
Figure 12H:
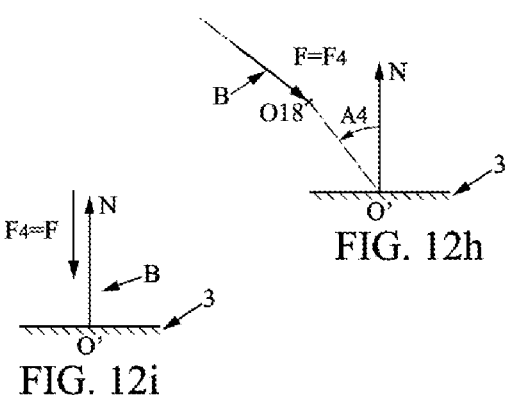
Figure 12I:
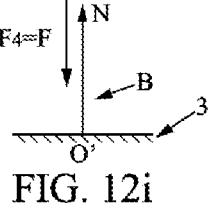

The second iteration of the method with the second sequence of steps (b') to (d') is represented in FIGS. 12d and 12e, the third one in FIGS. 12f and 12g, and the fourth and last one in FIGS. 12h and 12i.

Figure 13:
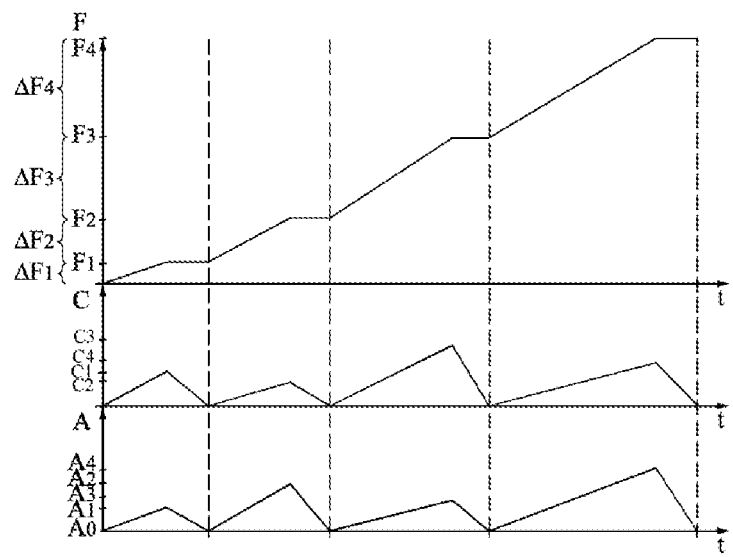
FIG. 13 represents the time charts of the different values assigned to the angle An and to the angle Cn and to the force Fn' throughout the method of FIGS. 12a to 12i, FIG. 14 schematically represents the orientation of the axis of the tool of the device of FIG. 9 in a Cartesian reference frame, FIG. 15 schematically represents, in the form of a flowchart, the method according to an embodiment in accordance with the invention.

The time charts represented in FIG. 13 represent the value of the force Fn' applied to the tool 1' throughout the above-described four iterations of the method, with the four increasing successive steps F1' to F4', as well as the variation of the value of the angle An and of the angle Cn. For more simplicity, the variation of the value of the angle Bn and of the angle Dn over time is not represented.

As represented in the time chart at the top of FIG. 13, the force Fn' may be applied over each of the iterations increasingly until reaching the desired value Fn' and then held at this value Fn' till the end of step (d'), on completion of which the orientation of the axis B' of the tool 1' with respect to the normal N' to the surface 3', about the first O' and second O18 centers of rotation is corrected to recover its initial position.

The variation of the force Fn' and of each of the angles An, Bn, Cn and Dn over each of said iterations may occur more or less quickly, and in a substantially linear manner, as represented in FIG. 13, or in any other manner, in particular in order to gain more accuracy and/or execution speed.

According to one embodiment, the tool 1' is a drilling tool.

Alternatively, the tool 1' may be of any other type of tools used in the context of aircrafts manufacturing, such as for example a riveting, welding, boring tool, etc.

According to one embodiment, at the end of step (a') and during each of steps (b') to (d'), the second center of rotation O18 is positioned opposite to the tool 1' with respect to the surface 3'.

Thus, and according to the findings of the inventor, such a position of the second center of rotation O18 improves the stability of the tool 1' during the application of the force F' by iterations throughout the method according to the invention, and in particular in comparison with a method providing for the second center of rotation O18 to be located on the same side of the surface 3' as the first center of rotation O', and in particular above the latter, according to the direction of the normal N' to the surface 3'.

The rotation of the axis B' of the tool 1' relative to the normal N' to the surface 3' about the first O' and second O18 centers of rotation is done with a reduced magnitude, which reduces the risks of slipping of the tool 1' on the surface 3' and facilitates the correction of the inclination of the axis B' with respect to the normal N' to the surface 3' about the first O' and second O18 centers of rotation, and therefore simplifies the method according to the invention.

The invention also relates to a device 10' comprising a tool 1' with:
  a support body 11' provided with means for measuring a reaction force R' of a surface 3' on said tool 1', when the tool 1' bears against said surface,
  means for bearing the tool F' against said surface 3', configured so as to achieve bearing of the tool 1' on said surface 3' with a variable orientation of the axis B' of the tool 1' with respect to the surface 3', according to two distinct centers of rotation: said first center of rotation O' being located at said surface 3' and said second center of rotation O18 away from said surface 3',
  first measuring means configured to measure said orientation of the normal N' of the surface 3' with respect to the axis B' of the tool 1', and
  second measuring means configured to measure the orientation of the line (O'O18) with respect to the axis B' of the tool 1',
  a tool operative portion 17', intended to be implemented to perform a manufacturing operation on said surface 3'.

According to the invention, said device 10' also comprises an articulated arm 2' at the end of which said tool 1' is fastened, the articulated arm 2' being configured so as to apply a push force with an axis A' to the tool 1', and monitoring means configured for the implementation of the steps of the method for pushing the tool 1' according to any of the previously-described embodiments.

All of the arrangements relating to the previously-described method apply to the device 10' according to the invention.

Figure 9:
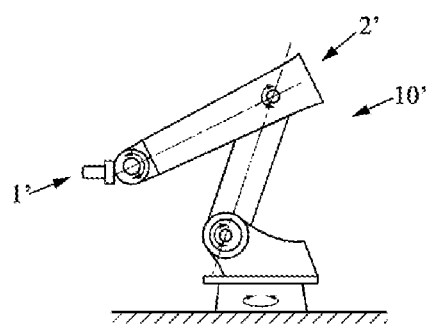
FIG. 9 is a schematic view of the device according to an embodiment in accordance with the invention.

As shown in the embodiment of FIG. 9, the articulated arm 2' of the device 10' is a robotic articulated arm commonly used in the aeronautic industry to carry out, in an automated way, different operations for manufacturing an aircraft, as previously described.

The orientation and the positioning of the tool 1', and therefore of the axis B', as well as the line O'O18, of the tool 1', in the space (O'xyz) are achieved thanks to the different articulations of the articulated arm 2', rigid fastening means being provided between said tool 1' and the end of the articulated arm 2' receiving the latter, configured so as to ensure immobilization of the tool 1' relative to the articulated arm 2'.

The tool operative portion 17' is the element that will carry out, as such, the desired manufacturing operation on said surface 3' of the part. For example, the tool operative portion 17' may be a drill bit in the case of a drilling operation, a mill cutter in the case of a milling operation, etc.

Thus, the operative portion of the tool 17' may be adapted to be displaced relative to the support body 1' of the tool 1', for example by being rotated about the axis B' of the tool 1' and/or by translating along said axis B', in the case of a drilling tool. Additional drive means (not represented) may be provided to this end.

Similarly, pushing the tool 1' with the force Fn' against the surface 3' may be carried out via the articulated arm 2' which urges the tool 1' against the surface 3'.

In particular, throughout the course of the method according to the invention, the positioning of the tool 1' during step (a'), the application of a force Fn' to the tool 1' during step (b') and the redirection of the tool 1' during step (d') can be performed thanks to the movements of the articulated arm 2', piloted via the monitoring means.

For example, the non-represented monitoring means may comprise one or several electronic circuit(s), configured so as to receive the information measured by the means for measuring a reaction force R' of the surface 3' on the tool 1', by the first means for measuring the orientation of the normal N' to said surface 3' with respect to the axis B' of the tool F' and by the second means for measuring the orientation of the line (O'O18) with respect to the axis B' of the tool 1', and to transmit control signals to the articulated arm 2' so as to execute said method.

For example, the monitoring means may comprise computer means.

As shown in the embodiments of Figured 10, 11a and 11b, the support body 11' of the tool 1' may comprise a fastening portion 13', configured so as to ensure the rigid fastening of the tool 1' at the end of the articulated arm 2', for example via fastening screws.

The support body 11' may also comprise a section 14' for receiving the operative portion of the tool 17', including for example an internal wall P14', configured to enable the passage of the operative portion of the tool 17' relative to the support body 11'.

Advantageously, said internal wall P14' has a shape matching with that of the tool operative portion 17', for example cylindrical in the case of a cylindrical-shaped tool operative portion 17'.

Figure 10:
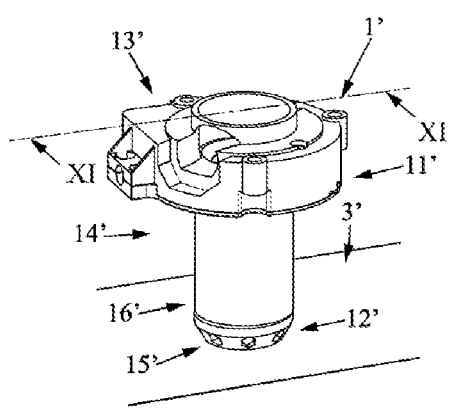
FIG. 10 is a perspective view of the tool of FIG. 9, FIGS. 11a and 11b are sectional views according to the line 11-11 of FIG. 10, the tool being in two distinct positions with respect to the surface, FIGS. 12a to 12i schematically represent different successive steps of the method according to an embodiment in accordance with the invention, with several iterations of steps (b') to (d')
Figure 11A:
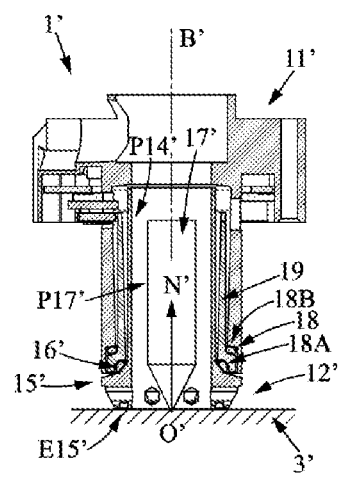
Figure 11B:
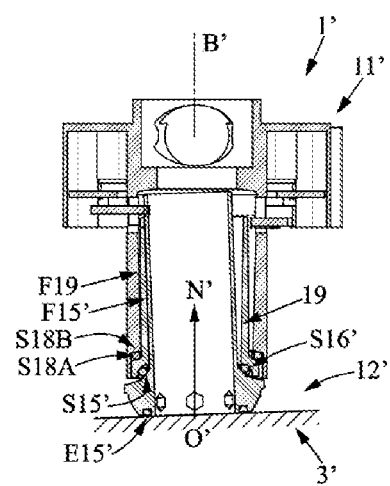

The fastening portion 13' may be disposed above the receiving section 14' of the support body 11' when the tool 1' bears on the surface 3', in its operating position for the implementation of the method according to the invention, as shown in the embodiments of FIGS. 10, 11a and 11b.

For example, the means for measuring a reaction force R' of the surface 3' on the tool 1' may comprise one or several force sensor(s) (for example strain gauges) disposed over the support body 11', and in particular on the section 14' for receiving the operative portion of the tool 17'.

Alternatively or complementarily, said means for measuring a reaction force R' of the surface 3' on the tool 1' may be disposed on the articulated arm 2'.

The first means for measuring the orientation of the normal N' to the surface 3' with respect to the axis B' of the tool 1' and/or the second means for measuring the orientation of the line (O'O18) with respect to the axis B' of the tool 1', may for example comprise one or several angular sensor(s) disposed on the tool 1'.

Advantageously, said first means for measuring the orientation of the normal N' to the surface 3' with respect to the axis B' of the tool 1' and/or the second means for measuring the orientation of the line (O'O18) with respect to the axis B' of the tool 1' may be configured to measure the modification of the orientation of the bearing means 12' of the tool 1' with respect to the normal N' to the surface 3', which corresponds to the orientation of the normal N' to the surface 3' with respect to the axis B' of the tool 1' about the first center of rotation O' combined with the orientation of the line (O'O18) with respect to the axis B' of the tool 1' about the second center of rotation O18.

According to one embodiment, the means for bearing the tool 1' against said surface 3' comprise:
- a first ball joint 12' with a center of rotation O' corresponding to said first center of rotation O' of the axis B' of the tool 1' with respect to the surface 3', comprising a first portion 15' having an end E15' intended to bear against said surface 3' and a second portion 16' secured to an intermediate part 19 between said first portion 15' and the support body 11', the first portion 15' being articulated relative to the second portion 16' according to at least two degrees of freedom, and
- a second ball joint 18 with a center of rotation O18 corresponding to said second center of rotation O18 of the axis B' of the tool 1' with respect to the surface 3', comprising a first portion 18A rigidly fastened to said intermediate part 19 and a second portion 18B rigidly fastened to the support body 11', the first portion 18A being articulated relative to the second portion 18B according to at least two degrees of freedom.

The end E15' serving for bearing may be configured so as to obtain a continuous or discontinuous circular bearing. For example, the circular bearing may have a diameter smaller than 5 cm, preferably smaller than 3 cm, and even more preferably smaller than 2 cm.

According to one embodiment, the first portion 15' of the ball joint 12' comprises a section S15' substantially forming a convex sphere section, and in particular a half-sphere, from which extends, on one side, the end E15' intended to bear against the surface 3', as well as, on the other side, a first sleeve F15', configured to internally receive, at least partially, the operative portion of the tool 17', the first means for measuring the orientation of the normal N' to the surface 3' with respect to the axis B' of the tool 1' being configured so as to measure the displacement of said first sleeve F15' relative to the support body 11'.

Said second portion 16' of the first ball joint 12' may then comprise a section S16' substantially forming a concave sphere section, and in particular a half-sphere, formed on said intermediate part 19, and configured to cooperate with said section S15' of the first portion 15' of the first ball joint 12'.

The first portion 18A of the second ball joint 18 may also comprise a section S18A substantially forming a convex sphere section formed on said intermediate part 19, and in particular a half-sphere from which extends, opposite to the end E15' of the first portion 15' of the first ball joint 12', a sleeve F19, internally receiving the first sleeve F15' of the first portion 15' of the first ball joint 12', the second means for measuring the orientation of the orientation of the line (O'O18) of the tool 1' with respect to the axis B' of the tool 1' being configured so as to measure the displacement of said second sleeve F19 with respect to the support body 11'.

Indeed, the angular variation of the angles An and Bn of the normal N to the surface 3 with respect to the axis B' of the tool 1', as well as the angular variation of the angles Cn and Dn of the line (O'O18) with respect to the axis B' of the tool 1', being small throughout the implementation of the method according to the invention, for example in the range of a few minutes of arc, it may turn out to be complicated to determine this angular variation at said section S15' of the first portion 15' of the first ball joint 12', as well as at said section S18A of the first portion 18A of the second ball joint 18.

Yet, the modification of the orientation of the normal N' to the surface 3' with respect to the axis B' of the tool 1' and the modification of the orientation of the line (O'O18) with respect to the axis B' of the tool 1' will generate a considerable displacement, respectively at the upper end of the first sleeve F15' and of the upper end of the second sleeve F19, that is to say the ends of the first F15' and second F19' sleeves located opposite to the end E15' of the first portion 15' of the first ball joint 12', by a lever arm effect, which is easier to measure to respectively determine the orientation of the first portion 15' with respect to the second portion 16' of the first ball joint 12 and the orientation of the first portion 18A with respect to the second portion 18B of the second ball joint 18.

As shown in the embodiment of FIGS. 11a and 11b, in order to facilitate this measurement, it may be advantageous to maximize this displacement using a first sleeve F15' and/or a second sleeve F19, each respectively with a large length, for example such that its respective upper end lies proximate to the fastening portion 13' of the support body 11'.

In order to facilitate the measurement of the displacement of the second sleeve F19 with respect to the support body 11' without hindering the measurement of the displacement of the first sleeve F15' with respect to the support body 11', the second sleeve F19 may have a length strictly smaller than the length of the first sleeve F15'.

Thus, the first means for measuring the orientation of the normal N' to the surface 3' with respect to the axis B' of the tool 1' and/or the second means for measuring the orientation of the line (O'O18) may advantageously be positioned, respectively, on the support body 11', on the section for receiving 14' the operative portion of the tool 17', and in particular proximate to the fastening portion 13' of the support body 11', which allows avoiding encumbering the area proximate to the end E15' of the first portion 15' of the first ball joint 12'.

In such an embodiment, the internal wall P14', enabling the passage of the tool operative portion 17', may correspond, at least partially, to the internal wall of the first sleeve F15'.

As shown in the embodiments of FIGS. 11a and 11b, the second portion 16' of the first ball joint 12' may comprise a section S16' substantially forming a concave sphere section, and in particular a half-sphere, with dimensions corresponding to the section S15' of the first portion 15' of the ball joint 12', in order to constitute a seat for said section S15' of the first portion 15' of the first ball joint 12', in order to enable the rotation of the first portion 15' relative to the second portion 16' about the previously-defined three axes (O'x), (O'y) and (O'z).

Similarly, said second portion 18B of the second ball joint 18 may comprise a section S18B substantially forming a concave sphere section, and in particular a half-sphere, with dimensions corresponding to the section S18A of the first portion 18A' of the second ball joint 18, in order to constitute a seat for said section S18A of the first portion 18A of the second ball joint 18, in order to enable the rotation of the first portion 18A with respect to the second portion 18B about the previously-defined three axes (O'x), (O'y) and (O'z).

For each of the first 12' and second 18 ball joints, friction reduction means, such as for example balls, may be provided in order to facilitate the rotation of the first portion 15', respectively 18A relative to the second portion 16', respectively 18B. Also, fastening means may be provided in order to ensure the translational immobilization, and in particular according to the axis (O'z) of the first portion 15', respectively 18A relative to the second portion 16', respectively 18B.

According to one embodiment, said first ball joint 12' is configured so that the center of rotation O' of the first ball joint 12' is disposed at the surface 3' when the end E15' of the first portion 15' of the first ball joint 12' bears against said surface 3'.

This arrangement is particularly advantageous because the force exerted by the tool 1' is applied at the center of rotation O' of the first ball joint 12'.

Thus, the modification of the orientation of the normal N' to the surface 3' with respect to the axis B' of the tool 1' will correspond to the modification of the orientation of the first portion 15' with respect to the second portion 16' of the ball joint 12', which simplifies the calculation of the orientation of the normal N' to the surface 3' with respect to the axis B' of the tool 1' about the first center of rotation O'.

Also, said second ball joint 18' may be configured so that the center of rotation O18 of the second ball joint 18 is away from the surface 3' and positioned opposite to the tool 1' with respect to the surface 3', when the end E15' of the first portion 15' of the ball joint 12' bears against said surface 3'.

As explained hereinabove, such a position of the second center of rotation O18 improves the stability of the tool 1' during the application of the force F' by iterations throughout the method according to the invention implemented with the device according to the invention, and in particular in comparison with a device providing for the second center of rotation O18 to be located on the same side of the surface 3' as the first center of rotation O', and in particular above the latter, according to the direction of the normal N' to the surface 3'.

The rotation of the axis B' of the tool 1' relative to the normal N' to the surface 3' about the first O' and second O18 centers of rotation is done with a reduced magnitude, which reduces the risks of slipping of the tool 1' on the surface 3' and facilitates the correction of the inclination of the axis B' with respect to the normal N' to the surface 3' about the first O' and second O18 centers of rotation.

Advantageously, the distance separating the first center of rotation O' of the first ball joint 12' from the second center of rotation O18 of the second ball joint 18 may be comprised between 10 mm and 60 mm.

Advantageously, the support body 11' has a substantially cylindrical shape. This allows reducing the bulk of the tool 1', and in particular in the case where the tool operative portion 17' has a cylindrical shape, such as for example a drilling tool.

Finally, the invention relates to a tool 1' intended to be positioned at the end of an articulated arm 2' to be pushed with a force F' according to an axis A' against a surface 3' with a normal N', wherein the tool 1' is adapted to pivot relative to the surface 3' when positioned against said surface 3', according to two distinct centers of rotation: a first center of rotation O' located at said surface 3' and a second center of rotation (O18) away from said surface 3', said tool 1' comprising:

a support body 11' provided with means for measuring a reaction force R' of a surface 3' on said tool 1', when the tool 1' bears against said surface 3', means for bearing the tool 1' against said surface 3', configured so as to achieve bearing of the tool 1' on said surface 3' with a variable orientation of the axis B' of the tool 1' with respect to the surface 3', according to two distinct centers of rotation: said first center of rotation O' located on said surface 3' and said second center of rotation O18 away from said surface 3', first measuring means configured to measure said orientation of the normal N' of the surface 3' with respect to the axis B' of the tool 1', and second measuring means configured to measure the orientation of the line (O'O18) with respect to the axis B' of the tool 1'.

In particular, said tool 1' may be adapted for the implementation of the pushing method according to the invention as previously described, all of the arrangements regarding the previously-described method being applicable to said tool 1'.

Similarly, said tool 1' may belong to the device 10' according to the invention intended for the implementation of the method according to the invention. All of the previously-described arrangements of the tool 1' of the device 10' according to the invention apply to the tool 1' according to the invention.

In particular, the means for bearing the tool 1' against said surface 3' may comprise:

a first ball joint 12' with a center of rotation O' corresponding to said first center of rotation O' of the axis B' of the tool 1' with respect to the surface 3', comprising a first portion 15' having an end E15' intended to bear against said surface 3' and a second portion 16' secured to an intermediate part 19 between said first portion 15' and the support body 11', the first portion 15' being articulated relative to the second portion 16' according to at least two degrees of freedom, and a second ball joint 18 with a center of rotation O18 corresponding to said second center of rotation O18 of the axis B' of the tool 1' with respect to the surface 3', comprising a first portion 18A rigidly fastened to said intermediate part 19 and a second portion 18B rigidly fastened to the support body 11', the first portion 18A being articulated relative to the second portion 18B according to at least two degrees of freedom.

Of course, other embodiments could have been considered by a person skilled in the art yet without departing from the scope of the invention defined by the claims hereinafter.

NOMENCLATURE

1, 1'. Tool
A, A'. Axis of the force
B, B'. Axis of the tool
11, 11'. Support body
12, 12', 18. Ball joint
13, 13'. Fastening portion
14, 14'. Section for receiving the tool
P14, P14'. Internal wall
15, 15'. Ball joint first portion
E15, E15'. End
F15, F15'. Sleeve
S15, S15'. Spherical portion
16, 16'. Ball joint second portion
S16, S16'. Spherical portion
O. Tip of the tool, center of rotation of the ball joint
17, 17'. Tool operative portion
P17, P17'. External peripheral wall
2, 2'. Articulated arm

3, 3'. Surface
N, N'. Normal
10, 10'. Device
F, Fn, F', Fn'. Effort
R, R'. Reaction force
CF, CF'. Friction cone
$\Theta$n, $\beta$n. Angle
O'. First center of rotation
O18. Second center of rotation
An, Bn, Cn, Dn. Angle
19. Intermediate part
F19. Sleeve

The invention claimed is:

1. A method for pushing, with a force (F) according to an axis (A), a tool (1) at the end of an articulated arm (2) against a surface (3) with a normal (N), comprising the steps of:
    (a) positioning the tool (1) against said surface (3), so as to make the axis (B) of the tool coincide with said axis (A) of the force (F), the axis (A) being directed according to a pair of angles ($\Theta$0, $\beta$0) with respect to the normal (N),
    (b) applying an increasing force to the tool (1) until reaching a value (Fn), corresponding to a fraction of the force (F), the value of the applied force (Fn) being monitored via means for measuring the reaction force (R) of the surface (3) on the tool (1),
    (c) measuring the pair of angles ($\Theta$n, $\beta$n) of the axis (B) of the tool (1) with respect to the normal (N), after having reached said force value (Fn),
    (d) redirecting the tool (1) such that the tool's axis (B) recovers said orientation according to said pair of angles ($\Theta$0, $\beta$0) with respect to the normal (N),
    the method wherein iteration is carried out to proceed, by repetition of steps (b) to (d), while progressively increasing the force (Fn) at each iteration, and until reaching the force value (F), the increase increment ($\Delta$Fn) between two successive steps (Fn) corresponding to the difference between the value (Fn) of one iteration and the value (Fn−1) of the previous iteration, said increment being smaller than a determined value, so as to prevent slipping of the tool (1) on the surface (3) throughout the method, from positioning of the tool (1) on the surface (3) during step (a) and until obtaining the desired force (F) on completion of step (d) of the last iteration of the method.

2. The method according to claim 1, wherein the axis (A) of the push force (F) corresponds to the normal (N) to the surface (3), such that said pair of angles corresponds to ($\Theta$0=0°, $\beta$0=0°).

3. The method according to claim 2, wherein the increase increment ($\Delta$Fn) is constant.

4. The method according to claim 1, wherein the increase increment ($\Delta$Fn) is constant.

5. The method according to claim 1, wherein the increase increment ($\Delta$Fn) between two successive steps (Fn) is non-constant, increasing.

6. The method according to claim 1, wherein the tool (1) is a drilling tool.

7. A device (10) comprising a tool (1) with:
    a support body (11) provided with means for measuring a reaction force (R) of a surface (3) on said tool (1), when the tool (1) bears against said surface,
    means for bearing (12) the tool (1) against said surface (3), configured so as to achieve bearing of the tool (1) on said surface (3) with a variable orientation of the axis (B) of the tool (1) with respect to the normal (N) to the surface (3), means for measuring said orientation of the axis (B) of the tool (1) with respect to the normal (N) of said surface (3), a tool operative portion (17), intended to be implemented to perform a manufacturing operation on said surface (3), said device (10) also comprising an articulated arm (2) at the end of which said tool (1) is fastened, the articulated arm (2) being configured so as to apply a push force with an axis (A) to the tool (1), and monitoring means including a processor, a storage and a set of instructions configured to cooperate with the processor and the storage to:

(a) position the tool (1) against said surface (3), so as to make the axis (B) of the tool coincide with said axis (A) of the force (F), the axis (A) being directed according to a pair of angles ($\Theta 0$, $\beta 0$) with respect to the normal (N), (b) apply an increasing force to the tool (1) until reaching a value (Fn), corresponding to a fraction of the force (F), the value of the applied force (Fn) being monitored via means for measuring the reaction force (R) of the surface (3) on the tool (1), (c) measure the pair of angles ($\Theta n$, $\beta n$) of the axis (B) of the tool (1) with respect to the normal (N), after having reached said force value (Fn), (d) redirect the tool (1) such that the tool's axis (B) recovers said orientation according to said pair of angles ($\Theta 0$, $\beta 0$) with respect to the normal (N), and iterate, by repetition of actions (b) to (d), while progressively increasing the force (Fn) at each iteration, and until reaching the force value (F), the increase increment ($\Delta Fn$) between two successive steps (Fn) corresponding to the difference between the value (Fn) of one iteration and the value (Fn−1) of the previous iteration, said increment being smaller than a determined value, so as to prevent slipping of the tool (1) on the surface (3) throughout increase of the force, from positioning of the tool (1) on the surface (3) during action (a) and until obtaining the desired force (F) on completion of action (d) of a last iteration.

8. The device (10) according to claim 7, wherein the means for bearing (12) the tool (1) against said surface (3) comprise a ball joint (12) comprising a first portion (15) having an end (E15) intended to bear against said surface (3) and a second portion (16) rigidly fastened to the support body (11), the first portion (15) being articulated relative to the second portion (16) according to three degrees of freedom, with a center of rotation (O).

9. The device (10) according to claim 8, wherein the first portion (15) of the ball joint (12) comprises a section (S15) substantially forming a convex sphere section, from which extends, on one side, the end (E15) intended to bear against the surface (3), as well as, on the other side, a sleeve (F15), configured to internally receive, at least partially, the operative portion of the tool (17), the means for measuring the orientation of the axis (B) of the tool (1) with respect to the surface (3) being configured so as to measure the displacement of said sleeve (F15) relative to the support body (11).

10. The device (10) according to claim 8, wherein said ball joint (12) is configured so that the center of rotation (O) of the ball joint (12) is disposed at the surface (3) when the end (E15) of the first portion (15) of the ball joint (12) bears against said surface (3).

11. The device (10) according to claim 10, wherein the support body (11) has a substantially cylindrical shape.

12. A method for pushing, with a force (F') according to an axis (A'), a tool (1') at the end of an articulated arm (2') against a surface (3') with a normal (N'), wherein the tool (1') is adapted to pivot relative to the surface (3') when positioned against said surface (3'), according to two distinct centers of rotation: a first center of rotation (O') located on said surface (3) and a second center of rotation (O18) away from said surface (3'), said method comprising the steps of:

(a') positioning the tool (1') against said surface (3'), so as to make the axis (B') of the tool coincide with said axis (A') of the force (F'), the axis (A') being directed according to a pair of angles (A0, B0) with respect to the normal (N') and the line (O'O18) being directed according to a pair of angles (C0, D0) with respect to the axis (B') of the tool (1'), (b') applying an increasing force to the tool (1') until reaching a value (Fn') corresponding to a fraction of the force (F'), the value of the applied force (Fn') being monitored via means for measuring the reaction force (R') of the surface (3') on the tool (1'), (c') after having reached said force value (Fn'):
measuring the pair of angles (An, Bn) of the inclination of the normal (N') of the surface (3') with respect to the axis (B') of the tool (1'), and
measuring the pair of angles (Cn, Dn) of the inclination of the line (O'O18) with respect to the axis (B') of the tool (1'), (d') redirecting the tool (1') with respect to the surface (3') according to two combined rotations about each of the two centers of rotation (O', O18) such that:
the axis (B') of the tool (1') recovers said orientation according to said pair of angles (A0, B0) with respect to the normal (N') to the surface (3'),
the pair of angles (Cn, Dn) is assigned the value (0°, 0°), so as to ensure the alignment of the line (O'O18) with the axis (B') of the tool (1'), and the method wherein iteration is carried out to proceed, by repetition of steps (b') to (d'), while progressively increasing the force (Fn') at each iteration, and until reaching the force value (F'), the increase increment ($\Delta Fn'$) between two successive steps (Fn') corresponding to the difference between the value (Fn') of one iteration and the value (Fn'−1) of the previous iteration, said increment being smaller than a determined value, so as to prevent slipping of the tool (1') on the surface (3') throughout the method, from positioning of the tool (1') on the surface (3') during step (a') and until obtaining the desired force (F') on completion of step (d') of the last iteration of the method.

13. The method according to claim 12, wherein the axis (A') of the push force (F') corresponds to the normal (N') to the surface (3'), such that said pair of angles (A0, B0) corresponds to the value (0°, 0°).

14. The method according to claim 12, wherein, according to a first alternative, the increase increment ($\Delta Fn'$) is constant, or, according to a second alternative, the increase increment ($\Delta Fn'$) between two successive steps (Fn') is non-constant, increasing.

15. The method according to claim 12, wherein, at the end of step (a') and during each of steps (b') to (d'), the second center of rotation (O18) is positioned opposite to the tool (1') with respect to the surface (3').

16. A device (10') comprising a tool (1') with:
a support body (11') provided with means for measuring a reaction force (R') of a surface (3') on said tool (1'), when the tool (1') bears against said surface, means for bearing the tool (1') against said surface (3'), configured so as to achieve bearing of the tool (1') on said surface (3') with a variable orientation of the axis (B') of the tool (1') with respect to the surface (3'), according to two distinct centers of rotation: said first center of rotation (O') being located at said surface (3') and said second center of rotation (O18) away from said surface (3'), first measuring means configured to measure said orientation of the normal (N') of the surface (3') with respect to the axis (B') of the tool (1'), and second measuring means configured to measure the orientation of the line (O'O18) with respect to the axis (B') of the tool (1'), a tool operative portion (17'), intended to be implemented to perform a manufacturing operation on said surface (3'), said device (10') also comprising an articulated arm (2') at the end of which said tool (1') is fastened, the articulated arm (2') being configured so as to apply a push force with an axis (A') to the tool (1'), and monitoring means including a processor, a storage and a set of instructions configured to cooperate with the processor and the storage to:

(a') position the tool (1') against said surface (3'), so as to make the axis (B') of the tool coincide with said axis (A') of the force (F'), the axis (A') being directed according to a pair of angles (A0, B0) with respect to the normal (N') and the line (O'O18) being directed according to a pair of angles (C0, D0) with respect to the axis (B') of the tool (1'), (b') apply an increasing force to the tool (1') until reaching a value (Fn') corresponding to a fraction of the force (F'), the value of the applied force (Fn') being monitored via means for measuring the reaction force (R') of the surface (3') on the tool (1'), (c') after having reached said force value (Fn'):

measure the pair of angles (An, Bn) of the inclination of the normal (N') of the surface (3') with respect to the axis (B') of the tool (1'), and measure the pair of angles (Cn, Dn) of the inclination of the line (O'O18) with respect to the axis (B') of the tool (1'), (d') redirect the tool (1') with respect to the surface (3') according to two combined rotations about each of the two centers of rotation (O', O18) such that:

the axis (B') of the tool (1') recovers said orientation according to said pair of angles (A0, B0) with respect to the normal (N') to the surface (3'), the pair of angles (Cn, Dn) is assiged the value (0°, 0°), so as to ensure the alignment of the line (O'O18) with the axis (B') of the tool (1'), and iterate, by repetition of actions (b') to (d'), while progressively increasing the force (Fn') at each iteration, and until reaching the force value (F'), the increase increment (ΔFn') between two successive steps (Fn') corresponding to the difference between the value (Fn') of one iteration and the value (Fn'-1) of the previous iteration, said increment being smaller than a determined value, so as to prevent slipping of the tool (1') on the surface (3') throughout the method, from positioning of the tool (1') on the surface (3') during action (a') and until obtaining the desired force (F') on completion of action (d') of a last iteration.

17. The device (10') according to claim 16, wherein the means for bearing the tool (1') against said surface (3') comprise:

a first ball joint (12') with a center of rotation (O') corresponding to said first center of rotation (O') of the axis (B') of the tool (1') with respect to the surface (3'), comprising a first portion (15') having an end (E15') intended to bear against said surface (3') and a second portion (16') secured to an intermediate part (19) between said first portion (15') and the support body (11'), the first portion (15') being articulated relative to the second portion (16') according to at least two degrees of freedom, and a second ball joint (18) with a center of rotation (O18) corresponding to said second center of rotation (O18) of the axis (B') of the tool (1') with respect to the surface (3'), comprising a first portion (18A) rigidly fastened to said intermediate part (19) and a second portion (18B) rigidly fastened to the support body (11'), the first portion (18A) being articulated relative to the second portion (18B) according to at least two degrees of freedom.

18. The device (10') according to claim 17, wherein the first portion (15') of the first ball joint (12') comprises a section (S15') substantially forming a convex sphere section, from which extends, on one side, the end (E15') intended to bear against the surface (3'), as well as, on the other side, a first sleeve (F15'), configured to internally receive, at least partially, the operative portion of the tool (17'), the first means for measuring the orientation of the normal (N') to the surface (3') with respect to the axis (B') of the tool (1') being configured so as to measure the displacement of said first sleeve (F15') relative to the support body (11'), wherein said second portion (16') of the first ball joint (12') comprises a section (S16') substantially forming a concave sphere section, formed on said intermediate part (19), and configured to cooperate with said section (S15') of the first portion (15') of the first ball joint (12'), wherein the first portion (18A) of the second ball joint (18) comprises a section (S18A) substantially forming a convex sphere section formed on said intermediate part (19), from which extends, opposite to the end (E15') of the first portion (15') of the first ball joint (12'), a sleeve (F19), internally receiving the first sleeve (F15') of the first portion (15') of the first ball joint (12'), the second means for measuring the orientation of the orientation of the line (O'O18) of the tool (1') with respect to the axis (B') of the tool (1') being configured so as to measure the displacement of said second sleeve (F19) relative to the support body (11').

19. The device (10) according to claim 17, wherein said first ball joint (12') is configured so that the first center of rotation (O') of the first ball joint (12') is disposed at the surface (3') when the end (E15') of the first portion (15') of the first ball joint (12') bears against said surface (3'), and wherein said second ball joint (18') is configured so that the second center of rotation (O18) of the second ball joint (18) is away from the surface (3') and positioned opposite to the tool (1') with respect to the surface (3'), when the end (E15') of the first portion (15') of the ball joint (12') bears against said surface (3').

* * * * *